(12) United States Patent
Hasegawa et al.

(10) Patent No.: US 11,964,519 B2
(45) Date of Patent: Apr. 23, 2024

(54) TIRE

(71) Applicant: BRIDGESTONE CORPORATION, Tokyo (JP)

(72) Inventors: Keiichi Hasegawa, Tokyo (JP); Takayuki Kurata, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 452 days.

(21) Appl. No.: 17/289,025

(22) PCT Filed: Oct. 31, 2019

(86) PCT No.: PCT/JP2019/042842
§ 371 (c)(1),
(2) Date: Apr. 27, 2021

(87) PCT Pub. No.: WO2020/090984
PCT Pub. Date: May 7, 2020

(65) Prior Publication Data
US 2022/0001704 A1 Jan. 6, 2022

(30) Foreign Application Priority Data
Oct. 31, 2018 (JP) .................................. 2018-205374

(51) Int. Cl.
*B60C 15/06* (2006.01)
*B60C 15/00* (2006.01)
*B60C 15/05* (2006.01)

(52) U.S. Cl.
CPC .......... *B60C 15/05* (2013.01); *B60C 15/0018* (2013.01); *B60C 15/0603* (2013.01); *B60C 15/0607* (2013.01)

(58) Field of Classification Search
CPC ............... B60C 15/0081; B60C 15/05; B60C 2001/058
See application file for complete search history.

(56) References Cited

U.S. PATENT DOCUMENTS

| | | | |
|---|---|---|---|
| 4,231,410 | A | 11/1980 | Vannan, Jr. |
| 2007/0163696 | A1 | 7/2007 | Iida |
| 2008/0066843 | A1 | 3/2008 | Alvarez et al. |

(Continued)

FOREIGN PATENT DOCUMENTS

| | | |
|---|---|---|
| CN | 1902062 A | 1/2007 |
| CN | 105142936 A | 12/2015 |

(Continued)

OTHER PUBLICATIONS

Machine Translation: JP-2010162826-A, Mori S, (Year: 2023).*

(Continued)

*Primary Examiner* — Kendra Ly
(74) *Attorney, Agent, or Firm* — Sughrue Mion, PLLC

(57) ABSTRACT

The bead portion of the tire has an inner bead provided inside the tire width direction of a carcass ply and an outer bead provided outside the tire width direction of the carcass ply. The inner bead and the outer bead have a bead core portion including a bead cord formed of a metal material, and a filler portion provided outside the tire radial direction of the bead core portion and formed of a resin material. The inner bead and the outer bead sandwich a carcass ply.

4 Claims, 4 Drawing Sheets

(56) References Cited

U.S. PATENT DOCUMENTS

| | | |
|---|---|---|
| 2013/0340910 A1 | 12/2013 | Miao |
| 2016/0082784 A1 | 3/2016 | Kohara |
| 2017/0210183 A1 | 7/2017 | Kon et al. |
| 2017/0282473 A1* | 10/2017 | Sugiyama ........... B60C 15/0018 |
| 2017/0305207 A1 | 10/2017 | Sportelli et al. |

FOREIGN PATENT DOCUMENTS

| | | | |
|---|---|---|---|
| JP | 9-300924 A | | 11/1997 |
| JP | 2002-187414 A | | 7/2002 |
| JP | 2002-307907 A | | 10/2002 |
| JP | 2007537083 A | | 12/2007 |
| JP | 2010-162826 A | | 7/2010 |
| JP | 2010162826 A | * | 7/2010 |
| JP | 2012-218569 A | | 11/2012 |
| JP | 2017-121909 A | | 7/2017 |
| JP | 2017-197176 A | | 11/2017 |
| WO | 2016/017508 A1 | | 2/2016 |

OTHER PUBLICATIONS

Chinese Search Report dated Jun. 6, 2022 from the Chinese Patent Office in Chinese Application No. 201980072331.7.
Extended European Search Report dated Jul. 6, 2022 in European Application No. 19880204.3.
International Search Report for PCT/JP2019/042842 dated Jan. 21, 2020 (PCT/ISA/210).

* cited by examiner

TIRE

CROSS REFERENCE TO RELATED APPLICATIONS

This application is a National Stage of International Application No. PCT/JP2019/042842 filed Oct. 31, 2019, claiming priority based on Japanese Patent Application No. 2018-205374 filed Oct. 31, 2018.

TECHNICAL FIELD

The present invention relates to a tire in which a part of a bead portion is formed of a resin material.

BACKGROUND ART

Conventionally, a tire in which void space of a bead core are filled with a resin is known (see Patent Literature 1.).
As a result, the amount of a metal bead cord can be reduced, so that the weight of the tire can be reduced.

CITATION LIST

Patent Literature

[PTL 1] Japanese Unexamined Patent Application Publication No. 2002-187414

SUMMARY OF INVENTION

Further development of the technique of using a resin for a part of the bead portion as described above has been studied, in which a bead core is formed by winding a bead cord covered with a resin material a plurality of times along the tire circumferential direction.

According to this method for forming the bead core, the bead core having high rigidity and light weight can be easily manufactured.

On the other hand, when such a bead core is used, there are the following problems. Specifically, the cross-sectional shape of the bead core is rectangular (square) in order to prevent voids for forming between the bead cords. Thus, such bead cores restrict the movement of the carcass plies in the manufacturing process.

In particular, in the case of vulcanizing raw tire, it is important that the position of the carcass ply is moved relative to other components such as the bead core to obtain a desired tire shape, but the movement of the carcass ply is restricted by the corners of the bead core.

Also, even after production, so-called fretting, in which the carcass ply is rubbed and damaged by the corners of the bead core, can occur.

Accordingly, an object of the present invention is to provide a tire that achieves both ease of manufacture and durability of the carcass ply even a part of the tire is made of a resin material.

One aspect of the present invention is a tire including a tread portion in contact with a road surface, a tire side portion continuous to the tread portion and positioned inside in a tire radial direction of the tread portion, and a bead portion continues to the tire side portion and positioned inside in the tire radial direction of the tire side portion. The tire includes a carcass ply forming a skeleton of the tire and the bead portion includes an inner bead provided inside the tire width direction of the carcass ply, and an outer bead provided outside the tire width direction of the carcass ply. The inner bead and the outer bead include a bead core portion including a bead cord formed of a metal material, and a filler portion formed of a resin material and disposed outside the tire radial direction of the bead core portion. The inner bead and the outer bead sandwich the carcass ply.

DESCRIPTION OF EMBODIMENTS

Figure 1:
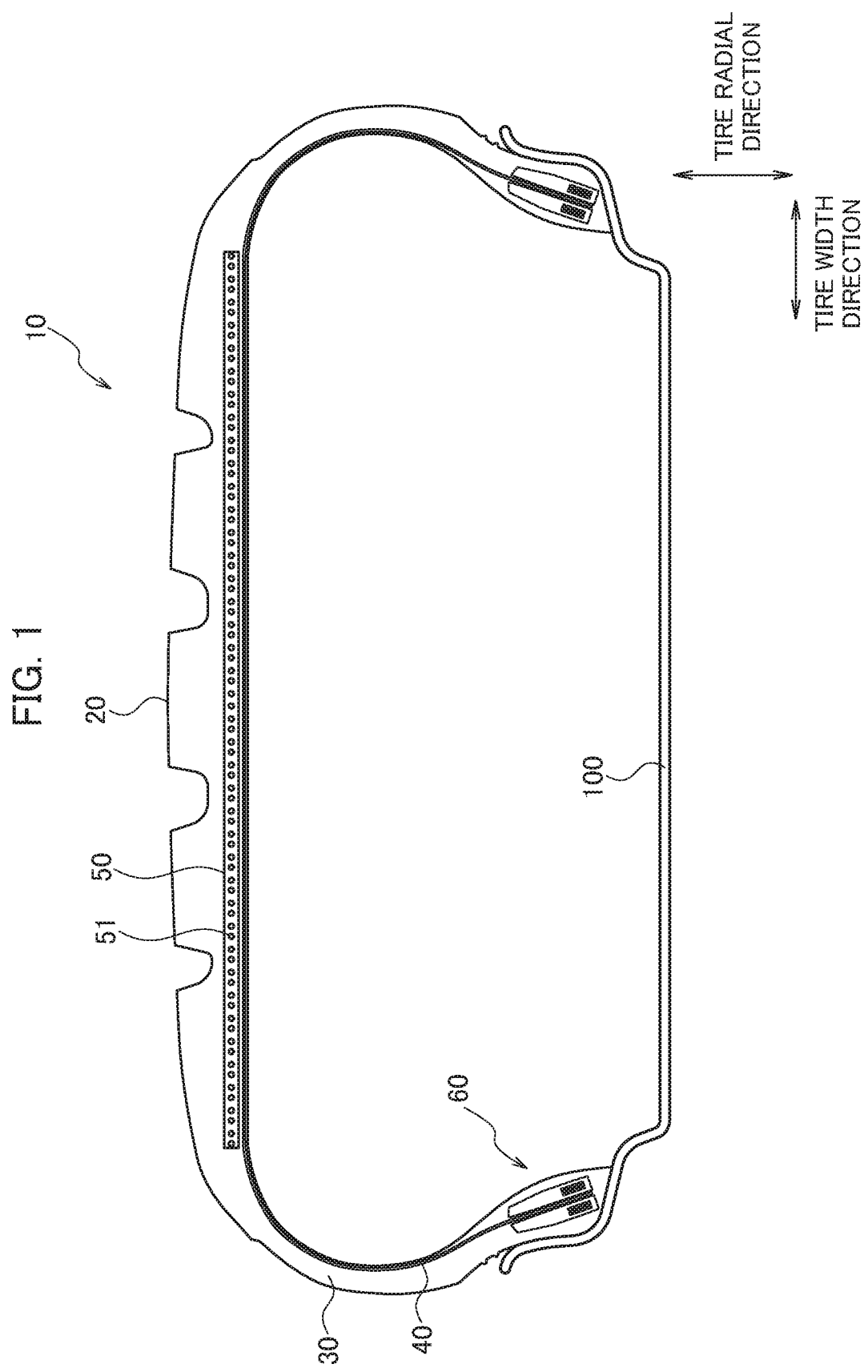
FIG. 1 is a cross-sectional view of a pneumatic tire 10.

Embodiments will be described below with reference to the drawings. The same functions and configurations are denoted by the same or similar reference numerals, and descriptions thereof are omitted as appropriate.

(1) Overall Structure of Tire

FIG. 1 is a sectional view of the pneumatic tire 10 according to the present embodiment. Specifically, FIG. 1 is a cross-sectional view of the pneumatic tire 10 along tire width direction and tire radial direction. In FIG. 1, the sectional hatching is not shown (hereinafter the same).

As shown in FIG. 1, the pneumatic tire 10 includes a tread portion 20, a tire side portion 30, a carcass ply 40, a belt layer 50, and a bead portion 60.

The tread portion 20 is a part contacting with a road surface (unillustrated). On the tread portion 20, a pattern (unillustrated) corresponding to the use environment of the pneumatic tire 10 and the kind of a vehicle to be mounted is formed.

The tire side portion 30 continues to the tread portion 20 and is positioned inside in the tire radial direction of the tread portion 20. The tire side portion 30 is a region from the tire width direction outside end of the tread portion 20 to the upper end of the bead portion 60. The tire side portion 30 is sometimes referred to as a side wall or the like.

The carcass ply 40 forms a skeleton of the pneumatic tire 10. The carcass ply 40 has a radial structure in which carcass cords (unillustrated) arranged radially along the tire radial direction are covered with a rubber material. However, the present invention is not limited to a radial structure, and may be a bias structure in which the carcass cords are arranged so as to cross each other in the tire radial direction.

The carcass cord is not particularly limited, and can be formed of an organic fiber cord in the same manner as a tire for a standard passenger car.

The belt layer 50 is provided inside the tire radial direction of the tread portion 20. The belt layer 50 is a single-layer spiral belt having a reinforcing cord 51 (see also FIG. 2) and the reinforcing cord 51 is covered with a resin. However, the belt layer 50 is not limited to a single-layer spiral belt. For example, the belt layer 50 may be a two-layer interlaced belt covered with rubber.

As the resin for covering the reinforcing cord 51, a resin material, having a higher tensile elastic modulus than that of a rubber material constituting the tire side portion 30 and a rubber material constituting the tread portion 20 are used. As the resin for covering the reinforcing cord 51, a thermoplastic resin having elasticity, a thermoplastic elastomer (TPE), a thermosetting resin or the like can be used. It is desirable to use a thermoplastic elastomer in consideration of elasticity in running and moldability manufacturing.

The thermoplastic elastomer includes a polyolefin-based thermoplastic elastomer (TPO), a polystyrene-based thermoplastic elastomer (TPS), a polyamide-based thermoplastic elastomer (TPA), a polyurethane-based thermoplastic elastomer (TPU), a polyester-based thermoplastic elastomer (TPC), a dynamically crosslinked thermoplastic elastomer (TPV), etc.

Examples of the thermoplastic resin include polyurethane resin, polyolefin resin, vinyl chloride resin, polyamide resin, and the like. Further as, the thermoplastic resin material, for example, a material having a deflection temperature under load (At 0.45 MPa Load) specified in ISO 75-2 ASTM D648 of 78° C. or more, a tensile yield strength specified in JIB K7113 of 10 MPa or more, a tensile fracture elongation specified in ns K7113 of 50% or more, and a Vicat softening temperature (method A) specified in JIS K7206 of 130° C. or more can be used.

The bead portion 60 continues to the tire side portion 30 and is positioned inside in the tire radial direction of tire side portion 30. The bead portion 60 is an annular shape extending to the tire circumferential direction.

A part of the bead portion 60 is made of a resin material. In this embodiment, a part of the bead portion 60 is formed of the same resin material as that used for the belt layer 50 described above.

An inner liner (unillustrated) for preventing air (or a gas such as nitrogen) filled in an internal space of the pneumatic tire 10 assembled to the rim wheel 100 from leaking is stuck to the tire inner side surface of the pneumatic tire 10.

(2) Outline of the Bead Portion

Figure 2:
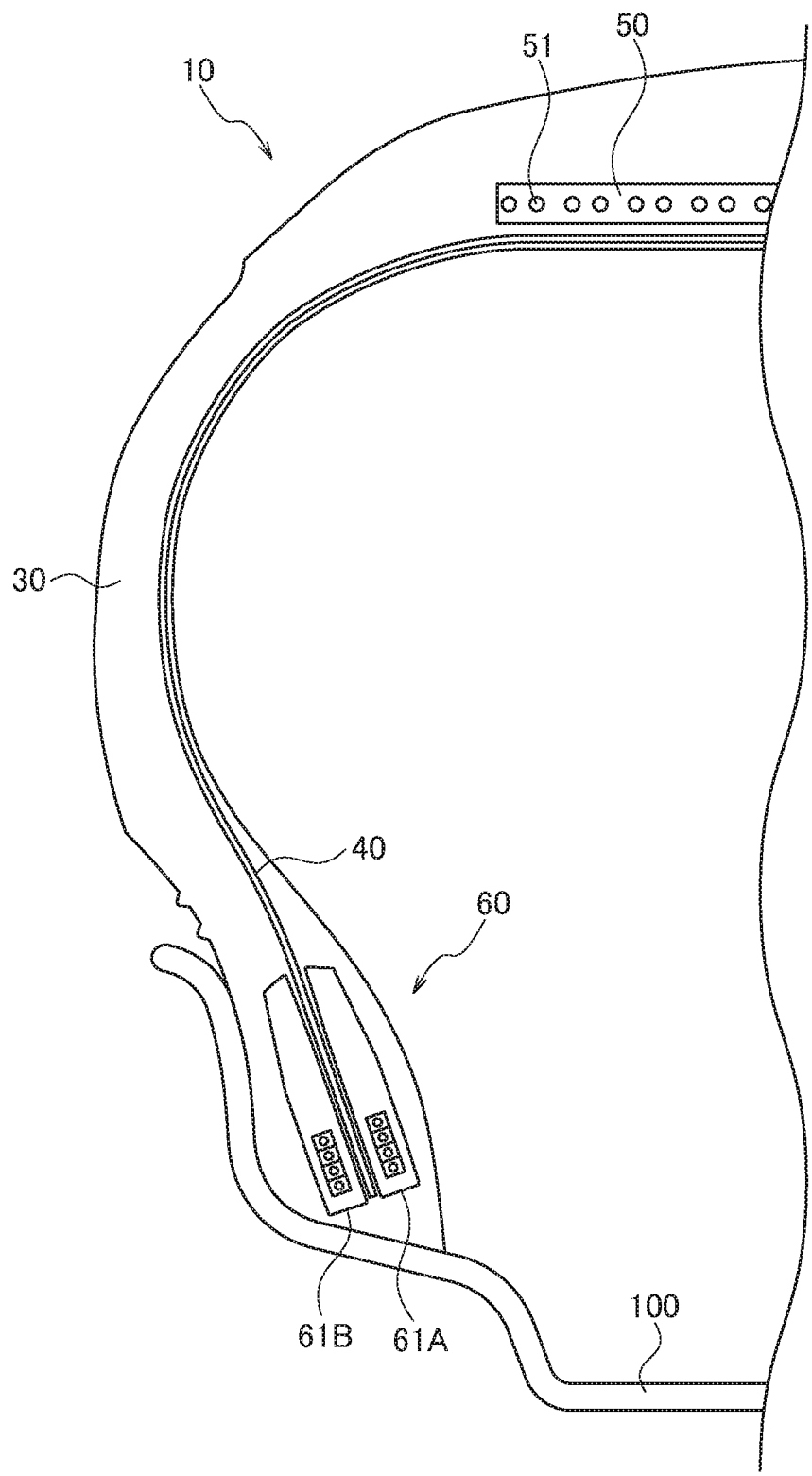
FIG. 2 is a partially enlarged sectional view of a portion of the pneumatic tire 10.

FIG. 2 is a partially enlarged sectional view of the pneumatic tire 10. Specifically, FIG. 2 is a partially enlarged cross-sectional view of pneumatic tire 10, including the bead portion 60 along the tire width direction and the tire radial direction.

As shown in FIG. 2, the bead portion 60 is divided into two beads. Specifically, the bead portion 60 has an inner bead 61 A provided inside in the tire width direction of the carcass ply 40 and an outer bead 61 B provided outside in the tire width direction of the carcass ply 40.

The inner bead 61 A and the outer bead 61 B sandwich the carcass ply 40. Specifically, when the pneumatic tire 10 in the raw tire state is vulcanized with the inner bead 61 A and the outer bead 61 B sandwiched between the carcass ply 40, the carcass ply 40 is firmly fixed, that is, vulcanized and bonded to the inner bead 61 A and the outer bead 61 B.

The carcass ply 40, unlike pneumatic tire having a typical bead core, is not folded back at the bead core and terminates between the inner bead 61 A and the outer bead 61 B.

(3) Detailed Configuration of Bead Portion

Figure 3:
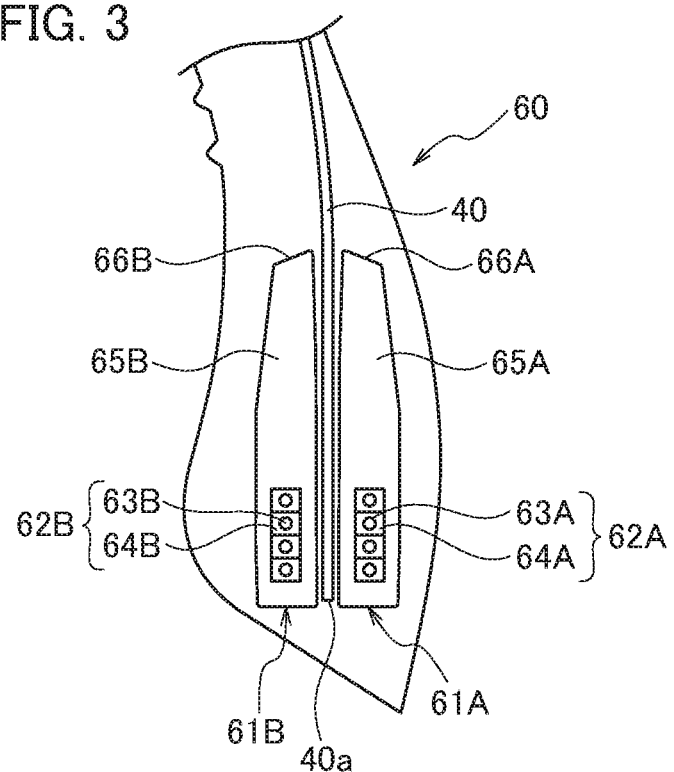
FIG. 3 is an enlarged cross-sectional view of a bead portion 60.

FIG. 3 is an enlarged sectional view of the bead portion 60. Specifically, FIG. 3 is an enlarged cross-sectional view of the bead portion 60 along the tire width direction and the tire radial direction of the pneumatic tire 10.

As shown in FIG. 3, the inner bead 61 A has a bead core portion 62 A and a filler portion 65 A. The inner bead 61 A is annular and extends along the tire circumferential direction.

In the present embodiment, in the cross-section along the tire width direction and the tire radial direction, the bead core portion 62 A has a plurality of cross sections of bead cords 63 A. Specifically, in the cross-section along the tire width direction and the tire radial direction, the bead core portion 62 A includes cross sections of four bead cords 63 A arranged along with the tire radial direction.

That is, at the area of the bead core portion 62 A, the cross sections of the plurality of bead cords 63 A are arranged adjacently along the tire radial direction.

A covering resin portion 64 A is formed around the bead cord 63 A. That is, the bead core portion 62 A has the covering resin portion 64 A, and is configured by the bead cord 63 A and the covering resin portion 64 A.

The covering resin portion 64 A is formed of a resin material and covers the bead cord 63 A. As the covering resin portion 64 A, the same resin material as that used in the belt layer 50 can be used. In this embodiment, the cross-sectional shape of the covering resin portion 64 A is square.

Actually, the bead core portion 62 A is formed by winding, a single bead cord 63 A covered by the covering resin portion 64 A around a plurality of laps (four laps) along the tire circumferential direction.

The bead cord 63 A is formed of a metal material (for example, steel). The filler portion 65 A is provided outside in the tire radial direction, of the bead core portion 62 A and is formed of a resin material.

The filler portion 65 A may also be made of the same resin material as that used in the belt layer 50. The resin material used for the covering resin portion 64 A may be different from or the same as the resin material used for the filler portion 65 A.

The outer bead 61B has the same configuration as the inner bead 61 A. Specifically, the outer bead 61 B has a bead core portion 62 B and a bead cord 63 B. The outer bead 61 B is also annular and extends along the tire circumferential direction.

In the cross-section along the tire width direction and the tire radial direction, the bead core portion 62 B includes cross sections of four bead cords 63 B arranged along with the tire radial direction.

That is, at the area of the bead core portion 62 B, the cross sections of the plurality of bead cords 63 B are arranged adjacently along the tire radial direction.

A covering resin portion 64 B is formed around the bead cord 63 B. That is, the bead core portion 62 B has a covering resin portion 64 B, and is configured by the bead cord 63 B and the covering resin portion 64 B.

The covering resin portion 64 B is formed of a resin material and covers, the head cord 63 B. As the covering resin portion 64 B, the same resin material as that used in the belt layer 50 can be used.

The bead cord 63 B is formed of a metal material (for example, steel). The filler portion 65 B is provided outside in the tire radial direction of the bead core portion 62 B and is formed of a resin material.

The filler portion 65 B may also be made of the same resin material as that used in the belt layer 50. The resin material used for the covering resin portion 64 B and the resin material used for the filler portion 65 B may be different or the same.

As described above, the inner bead 61 A and the outer bead 61 B sandwich the carcass ply 40. Specifically, the tire radial direction inner end 40 a of the carcass ply 40 is positioned between the inner bead 61 A and the outer bead 61 B.

More specifically the tire radial direction inner end 40 a extends to the inner end in the tire radial direction of the inner bead 61 A and the outer bead 61 B. It is preferable that the tire radial direction inner end 40 a does not, project to the inner side beyond the inner end in the tire radial direction of the inner bead 61 A and the outer bead 61 B.

A peak-shaped sloping surface 66 A is formed at the outer end in the tire radial direction of the filler portion 65 A. The peak-shaped sloping surface 66 A is inclined toward the inside of the tire radial direction as the filler portion 65 A is moved away from the carcass ply 40.

Similarly, a peak-shaped sloping surface 66 B is formed at the outer end in the tire radial direction of the filler portion 65 B The peak-shaped sloping surface 66 B is inclined toward the inside of the tire radial direction as the filler portion 65 B is moved away from the carcass ply 40.

That is, the inner bead 61 A and the outer bead 61 B have a shape approximately symmetrical with respect to the carcass ply 40.

(4) Function and Effects

According to the embodiment described above, the following effects can be obtained. Specifically, the bead portion 60 has an inner bead 61 A provided inside in the tire width direction of the carcass ply 40 and an outer bead 61 B provided outside in the tire width direction of the carcass ply 40. The inner bead 61 A and the outer bead 61 B sandwich the carcass ply 40.

That is, unlike the pneumatic tire having a typical bead core, the carcass ply 40 is not folded back at the bead core, so that the movement of the carcass ply 40 becomes easy when vulcanizing the pneumatic tire 10 in a raw tire state.

For this reason, during vulcanization, it is possible to allow the relative displacement of the carcass ply 40 with respect to the other constituent members (inner bead 61 A, outer bead 61 B, etc.), thereby making it easier to obtain a desired tire shape of the pneumatic tire 10.

On the other hand, after vulcanization, the carcass ply 40 is firmly fixed (vulcanization adhesion) to the inner bead 61 A and the outer bead 61 B, in other words, since the carcass ply 40 is sandwiched between the inner bead 61 A and the outer bead 61 B, the carcass ply 40 does not come off from between the inner bead 61 A and the outer bead 61 B.

Further, since the inner bead 61 A and the outer bead 61 B are shaped to sandwich the carcass ply 40, the carcass ply 40 is not damaged by the corners of the bead core having a conventional rectangular shape (square) in a cross-section.

The inner bead 61 A is provided outside in the tire of the bead core portion 62 A, and has the filler portion 65 A formed of a resin material. Similarly, the outer head 61 B is provided outside in the tire radial direction of the head core portion 62 B, and has a filler portion 65 B formed of a resin material.

That is, after vulcanization, since the inner bead 61 A and the outer bead 61 B are integrally formed and the filler portion 65 A and the filler portion 65 B are formed of a resin material, the bead portion 60 having high rigidity and light weight can be easily manufactured.

That is, according to the pneumatic tire 10, while a part of the bead portion 60 is made of a resin material, it is possible to achieve both the ease of manufacture and the durability of the carcass ply 40.

In this embodiment, the tire radial direction inner end 40 a of the carcass ply 40 is positioned between the inner bead 61 A and the outer bead 61 B. In particular, in this embodiment, the tire radial direction inner end 40 a extends to the inner end in the tire radial direction of the inner bead 61 A and the outer bead 61 B.

Therefore, the carcass ply 40 can be held more firmly, and the carcass ply 40 can be more surely prevented from coming off from between the inner bead 61 A and the outer bead 61 B. Further, since the tire radial direction inner end 40 a does not project to the inner side beyond the inner end in the tire radial direction of the inner bead 61 A and the outer bead 61 B, the tire radial direction inside end 40 a is not damaged. Thus, the durability of the carcass ply 40 can be further improved.

In the present embodiment, in the cross-section along the tire width direction and the tire radial direction, at the area of the bead core portion 62 A (bead core portion 62 B), the cross sections of the plurality of bead cords 63 A (bead cords 63) are arranged adjacently along the tire radial direction.

Therefore, rigidity required for the bead portion 60 can be secured while suppressing the widths of the bead core, portion 62 A and the bead core portion 62 B.

In the present embodiment, at the outer end of the tire radial direction of the filler portion 65 A (filler portion 65 B), the peak-shaped sloping surface 66 A (peak-shaped sloping surface 66 B) which is inclined toward the inside of the tire radial direction as the filler portion 65 A is moved away from the carcass ply 40.

Thus, the weight of the filler portion 65 A and the filler portion 65 B can be reduced while the falling down of the carcass ply 40 is suppressed by the filler portion 65 A and the filler portion 65 B.

(5) Other Embodiments

Although the contents of the present invention have been described above with reference to the examples, it will be obvious to those skilled in the art that the present invention is not limited to these descriptions and that various modifications and improvements are possible.

Figure 4:
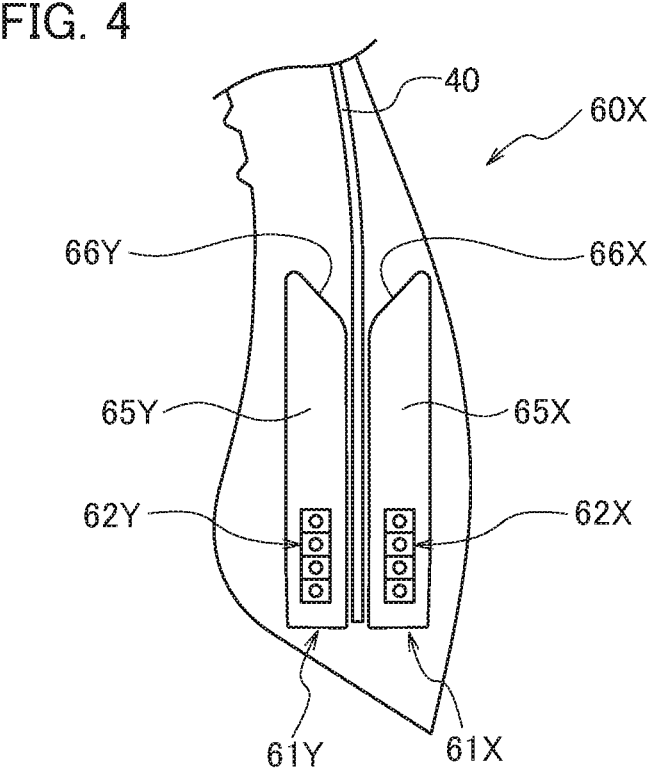
FIG. 4 is an enlarged cross-sectional view of a bead portion 60 X according to a modified example.

For example, the shape of the bead portion 60 may be modified as follows. FIG. 4 is an enlarged sectional view of the bead portion 60 X according to the modified example. Specifically, FIG. 4 is an enlarged cross-sectional view of a bead portion 60 X along tire width direction and tire radial direction of the pneumatic tire 10.

As shown in FIG. 4, the bead portion 60 X has an inner bead 61 X and an outer bead 61 Y. The inner bead 61 X has a bead core portion 62 X and a filler portion 65 X. The outer bead 61Y has a bead core portion 62 Y and a filler portion 65 Y.

At the outer end of the tire radial direction of the filler Portion 65 X (filler Portion 65 Y), a valley-shaped sloping surface 66 X (valley-shaped sloping surface 66 Y) which is inclined toward the outer side in the tire radial direction as the filler portion 65 X (filler Portion 66 Y) is moved away from the carcass ply 40.

According to the inner bead 61 X (outer Bead 61 Y) having the valley-shaped sloping surface 66 X (valley-shaped sloping surface 66 Y) formed on the filler portion 65 X (filler portion 60 Y), since the outer end in the tire radial direction of the inner bead 61 X (outer Bead 61 Y) can be prevented from interfering with the carcass ply 40, it is possible to surely prevent the carcass ply 40 from being damaged by rubbing against the inner bead 61 X or the outer bead 61 Y. Thus the durability of the carcass ply 40 can be further improved.

The positions of the inner bead 61 X and the outer bead 61 Y according to the above described embodiment may be changed as follows.

Figure 5:
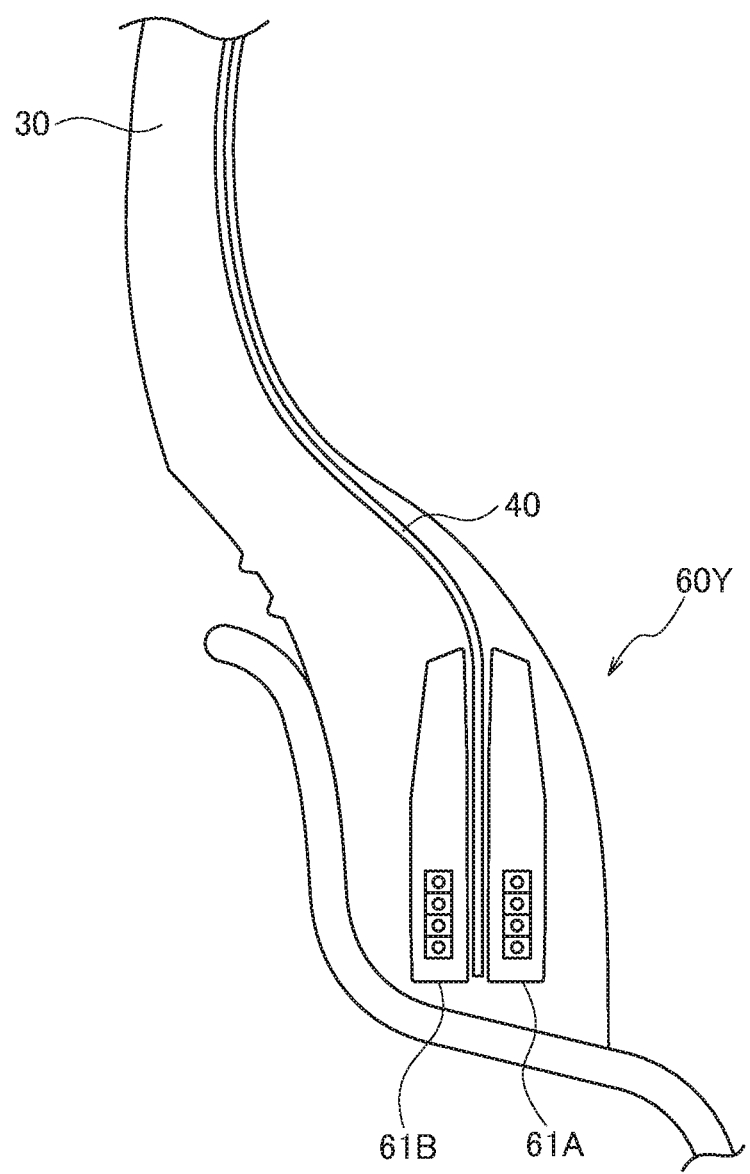
FIG. 5 is an enlarged cross-sectional view of a bead portion 60 Y according to a modified example.

FIG. 5 is an enlarged sectional view of the bead portion 60 Y according to the modified example. As shown in FIG. 5, in the bead portion 60 Y, the inner bead 61 A and the outer bead 61 B are not inclined with respect to the tire width direction and are generally parallel to the tire width direction. That is, as compared with the bead portion 60 described above, in the bead portion 60 Y, the inner bead 61 A and the outer bead 61 B are less inclined with respect to the tire radial direction and are provided so as to be upright along the tire radial direction.

In the embodiment described above, the inner bead 61 A and the outer bead 61 B have symmetrical shapes, but the inner bead 61 A and the outer bead 61 B may not necessarily have symmetrical shapes. Alternatively, the positions of the inner bead 61 A and the outer bead 61 B in the tire radial direction may not necessarily coincide with each other.

Further, in the embodiment described above, the number of bead, cord cross sections for the inner bead 61 A and the outer bead 61 B is similar, i.e., the inner bead 61 A and the outer bead 61 B have the same number of turns of the bead cord along, the tire circumferential direction, but the number of turns (that is, the number of bead cord sections) may be different for the inner bead 61 A and the outer bead 61 B.

In the embodiment described above, in the bead core portion 62 A (bead core portion 62 B), the cross sections of a plurality of bead cords 63 A (bead cord 63 B) are disposed adjacently along the tire radial direction, but the bead cords 63 A (bead cord 63 B) may be disposed in a plurality of rows rather than in a single row along the tire radial direction.

While embodiments of the invention have been described as above, it should not be understood that the statements and drawings which form part of this disclosure are intended to limit the invention. Various alternative embodiments, examples and, operating techniques will become apparent to these skilled in the art from this disclosure.

REFERENCE SIGNS LIST

10 Pneumatic tire
20 Tread portion
30 Tire side portion
40 Carcass ply
40 a Tire radial direction inner edge
50 Belt layer
51 Reinforcement cord
60, 60 X, 60 Y Bead portion
61 A, 61 X Inner bead
61 B, 61 Y Outer bead
62 A, 62 B Bead core
63 A, 63 B Bead cord
64 A, 64 B covering resin portion
65 A, 65 B, 65 X, 65 Y Filler portion
66 A, 66 B Peak-shaped sloping surface
66 X, 66 Y Valley-shaped sloping surface
100 Rim wheel

The invention claimed is:

1. A tire comprising:
a tread portion in contact with a road surface;
a tire side portion continuous to the tread portion and positioned inside in a tire radial direction of the tread portion; and
a bead portion continues to the tire side portion and positioned inside in the tire radial direction of the tire side portion,
wherein the tire comprises a carcass ply forming a skeleton of the tire and
the bead portion comprises:
an inner bead provided inside the tire width direction of the carcass ply; and
an outer bead provided outside the tire width direction of the carcass ply, wherein
the inner bead and the outer bead comprise:
a bead core portion including a bead cord formed of a metal material; and
a filler portion formed of a resin material and disposed outside the tire radial direction of the bead core portion, wherein
the inner bead and the outer bead sandwich the carcass ply;
wherein the outer end in the tire radial direction of the filler portion is formed with a valley-shaped sloping surface inclined toward the outer side in the tire radial direction as the filler portion moves away from the carcass ply.

2. The tire according to claim 1, wherein the inner end in the tire radial direction of the carcass ply is positioned between the inner bead and the outer bead.

3. The tire according to claim 2, wherein in cross-section along the tire width direction and the tire radial direction, the bead core portion includes a plurality of bead cord sections disposed adjacent to each other.

4. The tire according to claim 1, wherein in cross-section along the tire width direction and the tire radial direction, the bead core portion includes a plurality of bead cord sections disposed adjacent to each other.

* * * * *